United States Patent [19]

Van Put et al.

[11] Patent Number: 5,858,315
[45] Date of Patent: Jan. 12, 1999

[54] PROCESS FOR THE EXTRACTION OF ZINC FROM SULPHIDE CONCENTRATES

[75] Inventors: John W. Van Put, Antwerp; Francois M. I. G. Terwinghe; Thierry S. A. De Nys, both of Mol, all of Belgium

[73] Assignee: N.V. Union Miniere S.A., Brussels, Belgium

[21] Appl. No.: 591,660

[22] PCT Filed: Aug. 24, 1994

[86] PCT No.: PCT/EP94/02794

§ 371 Date: Apr. 24, 1996

§ 102(e) Date: Apr. 24, 1996

[87] PCT Pub. No.: WO95/06140

PCT Pub. Date: Mar. 2, 1995

[30] Foreign Application Priority Data

Aug. 27, 1993 [BE] Belgium ................................ 9300882
Dec. 23, 1993 [BE] Belgium ................................ 9301451

[51] Int. Cl.⁶ ............................ C01G 9/00; C22B 19/00
[52] U.S. Cl. .............................................................. 423/109
[58] Field of Search .............................................. 423/109

[56] References Cited

U.S. PATENT DOCUMENTS 3,976,743   8/1976   Landucci et al. .
4,004,991   1/1977   Veltman et al. .
4,107,265   8/1978   Von Röpenack et al. .
4,510,028   4/1985   Bolton et al. ........................... 423/109

FOREIGN PATENT DOCUMENTS 724214    5/1969   Belgium .
0071684   2/1983   European Pat. Off. .
071684    2/1983   European Pat. Off. .
0166710   1/1986   European Pat. Off. .
428194    5/1991   European Pat. Off. .
0451456  10/1991   European Pat. Off. .
451456   10/1991   European Pat. Off. .
91/09146  6/1991   WIPO .
WO 9109146 6/1991   WIPO .
WO 9315236 8/1993   WIPO .

*Primary Examiner*—Steven Bos
*Attorney, Agent, or Firm*—Lowe, Price, LeBlanc & Becker

[57] ABSTRACT

A portion of the concentrates is roasted and a portion of the resulting calcine is subjected to a neutral leaching step. Another portion of the concentrates is directly leached in an acidic medium in the presence of oxygen and under atmospheric conditions together with at least a portion of the neutral leaching residue. The zinc- and iron-rich solution resulting from acid leaching is neutralised with another portion of the calcine, the iron is removed and the solution is reused in the neutral leaching step. The method enables a gradual increase in the capacity of an existing zinc plant in accordance with demand, while capital costs may advantageously be spread out over time.

26 Claims, 4 Drawing Sheets

PROCESS FOR THE EXTRACTION OF ZINC FROM SULPHIDE CONCENTRATES

FIELD OF THE INVENTION

The present invention relates to a process for the extraction of zinc from zinc sulphide concentrates, comprising the following operations:

(a) roasting a portion of the concentrates so as to produce calcine, (b) neutral leaching of calcine produced in the operation (a) with return spent electrolyte so as to produce a leachate which is rich in zinc and substantially iron-free, which is separated, and a zinc ferrite residue, which is separated, (c) leaching of another portion of the concentrates and of at least a portion of the zinc ferrite residue produced in the operation (b) with a solution of sulphuric acid returning from electrolysis at 60°–95° C. in atmospheric conditions and in the presence of finely dispersed oxygen so as to produce a leachate which is rich in zinc and in iron, which is separated, and a leaching residue which is depleted in zinc, which is separated, the quantities of concentrates and of zinc ferrite which are used in this operation (c) being such that the molar ratio of the iron contained in the ferrite and the reactive sulphur contained in the concentrates is at least approximately 0.2, (d) conditioning, preparatory to the following operation, of the leachate which is rich in zinc and in iron, produced in the operation (c), (e) precipitation of the major portion of the iron contained in the solution conditioned in the operation (d) so as to produce a solution which is rich in zinc and depleted in iron and a ferriferous precipitate, which is separated, and (f) introduction of the solution which is rich in zinc and depleted in iron into the neutral leaching in (b).

The following should be understood here by

"zinc sulphide concentrate": a concentrate containing, in the form of sulphides, chiefly zinc and iron and, in smaller proportions, copper, silver and/or lead;

"in atmospheric conditions": in conditions which do not require the use of autoclaves, that is to say at a pressure equal to or differing by less than 20 kPa from atmospheric pressure; and "reactive sulphur": the sulphur present in the form of sulphide in the zinc sulphide concentrates and in the leaching residue which is rich in zinc (an expression employed later) and which can be oxidized by ferric sulphate according to the reaction:

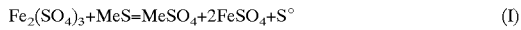

$$Fe_2(SO_4)_3 + MeS = MeSO_4 + 2FeSO_4 + S° \qquad (I)$$

in which Me denotes Zn, Fe, Cu, Pb or Ag. (the reactive sulphur generally consists of all the sulphur present in the form of sulphide less the pyrite sulphur).

Using the process of the invention, a leachate which is rich in zinc and substantially iron-free, a leaching residue which is depleted in zinc and a ferriferous precipitate are therefore obtained. This leachate can be purified and subsequently electrolysed in order to extract the zinc from it. The leaching residue which is depleted in zinc, and which contains sulphur, lead sulphates, silver compounds, undissolved sulphides (pyrites) and gangue, can be subjected to an appropriate treatment in order to extract the sulphur and the valuable metals from it. The ferriferous precipitate can be stored or, when it is pure enough, can be employed as pigment or as source of iron in the steel industry.

BACKGROUND

A process similar to that as defined above is described in document EP-A-0451456. In this known process, all of the calcine produced in the operation (a) is leached in the operation (b) and all of the ferrite produced in the operation (b) is leached in the operation (c), while employing a concentrate:ferrite ratio such that approximately 15 to 20% of the trivalent iron, required for the oxidation according to reaction (I) of the reactive sulphur present in the concentrate, originates from the leaching of the ferrite according to the reaction

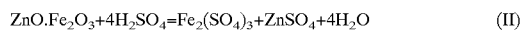

$$ZnO.Fe_2O_3 + 4H_2SO_4 = Fe_2(SO_4)_3 + ZnSO_4 + 4H_2O \qquad (II)$$

The remainder of the trivalent iron required for the oxidation of the reactive sulphur is obtained by the reaction

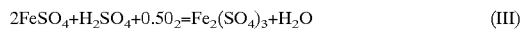

$$2FeSO_4 + H_2SO_4 + 0.5O_2 = Fe_2(SO_4)_3 + H_2O \qquad (III)$$

It is proposed to work in (c) in such a manner that the leachate which is rich in zinc and in iron has a sulphuric acid content of 10–25 g/l and an $Fe^{3+}$ content of less than 10 g/l, which is apparently unobtainable in a single leaching stage. This is why the leaching in (c) is carried out in two stages.

In the first stage, the zinc ferrite and a leaching residue which is rich in zinc, produced in the second stage, are treated with the solution of acid returning from electrolysis so as to produce a primary leachate containing 50–90 g/l of $H_2SO_4$ and the leaching residue which is depleted in zinc, which are separated. No oxygen is employed in this first leaching stage, this being to make it possible to use in this stage simpler types of reactors than in the second stage. The involvement of reaction (III) is therefore not brought about in the first stage.

In the second stage, the concentrates are treated with the said primary leachate in the presence of finely dispersed oxygen so as to produce, by reactions (I) and (III), a leachate which is rich in zinc and in iron and a leaching residue which is rich in zinc. At the end of this second stage, the operation (d) is performed by adding a small quantity of fresh concentrate to the leaching pulp so as to convert ferric sulphate into ferrous sulphate by reaction (I); the operation (d) is therefore incorporated into the operation (c) and, as a result of the second leaching stage, there is obtained the leaching residue which is rich in zinc, which is separated and recycled into the first stage, and a leachate which is rich in zinc and in iron, which is already conditioned.

The operation (e) is performed by adding more concentrate to the conditioned solution and by then precipitating the iron in haematite form by oxidation in an autoclave.

This produces, on the one hand, the said solution which is rich in zinc and depleted in iron and, on the other hand, a precipitate of haematite containing a small quantity of elemental sulphur and of sulphides. This sulphur and these sulphides are subsequently separated from the haematite by flotation. The reason why the concentrate is used in the operation (e) is not given. A possible explanation could be that the acidity of the conditioned solution is too high to permit a suitable precipitation of the iron and that, because of this, concentrate is added as neutralizing agent (reactions (I) and (II)).

This known process therefore requires leaching in two stages and, since the work is carried out with a concentrates:ferrite ratio such that approximately 15 to 20% of the trivalent iron, required for the oxidation according to reaction (I) of the reactive sulphur present in the concentrate, originates from the leaching of the ferrite in accordance with reaction (II) and that oxygen is not employed in the first leaching stage, it is necessary to oxidize approximately 80 to 85% of the reactive sulphur in the second leaching stage using trivalent iron obtained by reaction (III), when a zinc leaching yield close on 100% is aimed at.

However, the Applicant has found that in these conditions the second leaching stage takes place very slowly, and this obviously constitutes a serious disadvantage. Another disadvantage of this known process lies in the fact that the operation (c) is not easy to control because the leaching yield is determined solely by the ratio of the reactive sulphur to the zinc ferrite which are introduced into the first leaching stage and because the system reacts very slowly to corrections which are made to this ratio.

Furthermore, the use of this known process in existing hydrometallurgical zinc plants would almost always entail a considerable investment for purchasing the autoclaves required for the operation (e). In fact, to the Applicant's knowledge, there are only two plants in the world which make haematite and which are therefore already equipped with such autoclaves; all the others make jarosite or goethite in atmospheric conditions and are therefore not endowed with such autoclaves.

Moreover, as in this known process all of the ferrite produced in the operation (b) is leached in (c) while employing a concentrate:ferrite ratio such that approximately 15 to 20% of the trivalent iron, required for the oxidation of the reactive sulphur, originates from the leaching of the ferrite, the installation of this process in an existing plant, the roasting capacity of which would quite logically be maintained at the existing level, would have to result at once in approximately doubling the plant capacity. However, an increase in the capacity of an existing plant which is as substantial as this all at once, which will be unavoidably accompanied with substantial investments, will not often be opportune. The process therefore lacks some degree of flexibility.

What is more, this known process produces a haematite which is soiled with sulphur and sulphides.

SUMMARY OF THE INVENTION

The objective of the present invention is to provide a process as defined above which avoids the disadvantages of the known process.

To this end, according to the invention (1) only a portion of the calcine produced in the operation (a) is leached in the operation (b), (2) the leaching in (c) is performed
   either in a single stage, in which case the work is done so that the leachate which is rich in zinc and in iron has a sulphuric acid content of 45–75 g/l, preferably of 55–65 g/l, and an $Fe^{3+}$ content of 1–10 g/l, preferably of 2–5 g/l,
   or in two stages, in which case the work is done so that the leachate which is rich in zinc and in iron has a sulphuric acid content of 10–35 g/l, preferably of 10–25 g/l, and an $Fe^{3+}$ content of 0.1–2 g/l, preferably of 0.5–1 g/l, the first stage comprising treating the zinc ferrite and a leaching residue which is rich in zinc, produced in the second stage, with the solution of sulphuric acid returning from electrolysis in the presence of finely dispersed oxygen so as to produce a primary leachate and the said leaching residue which is depleted in zinc, which are separated, and the second stage comprising treating the concentrates with the said primary leachate in the presence of finely dispersed oxygen so as to produce the said leachate which is rich in zinc and in iron and the said leaching residue which is rich in zinc, which are separated, this second stage being performed in conditions such that less than 60% and preferably less than 50% of the reactive sulphur are oxidized therein and that the leaching residue which is rich in zinc produced therein has a reactive sulphur content which is appreciably higher than that which can be oxidized in the first stage by the iron present in the ferrite, (3) the operation (d) is performed by treating the leachate which is rich in zinc and in iron with yet another portion of the concentrates so as to return its $Fe^{3+}$ content below 5 g/l and preferably to 1–3 g/l, it being possible for this reducing treatment to be omitted when the leachate which is rich in zinc and in iron already has an $Fe^{3+}$ content of less than 5 g/l, and by treating the solution of low $Fe^{3+}$ content with another portion of the calcine produced in the operation (a), so as to return the free $H_2SO_4$ content of this solution below 10 g/l and preferably to 3–5 g/l, this neutralization treatment producing, on the one hand, a zinc ferrite residue, which is separated and subsequently treated in the same way as the ferrite produced in the operation (b) and, on the other hand, a conditioned solution, (4) the operation (e) is performed by precipitating the iron in a manner which is known per se in the form of goethite, haematite, jarosite or other compound which has suitable filterability, this being in the absence of zinc sulphide concentrate, and (5) the leaching in the operation (c) is carried out on
   either all of the ferrite residue produced in the operations (b) and (d),
   or only a portion of this ferrite, in which case the remainder of this ferrite is treated separately in a manner which is known per se by hot acidic leaching, this treatment producing another leachate which is rich in zinc and in iron, and this solution is subjected to the operations (d), (e) and (f) together with the leachate which is rich in zinc and in iron, produced in the operation (c).

In fact, by leaching in the operation (b) only a portion of the calcine produced in the operation (a), it is possible to employ another portion of this calcine in the operation (d).

By performing the operation (c) as defined in (2), the leaching period is appreciably shortened, whether working in only one or in two stages, as will be demonstrated later, and this operation (c) can be easily controlled, given that the leaching yield is now determined by the quantity of oxygen used and that the system reacts promptly to corrections which are made to this parameter.

By performing the operation (d) as defined in (3), a conditioned solution is obtained in which the iron can be precipitated by any conventional oxidation and hydrolysis technique, this being done with a minimum of neutralizing agent, when goethite or jarosite is precipitated, and without it being necessary to add zinc sulphide concentrate, when haematite is precipitated.

By performing the operation (e) as defined in (4), the process of the invention can be installed in any existing hydrometallurgical zinc plant whatever, without this necessarily entailing a large investment.

Owing to its characteristic defined in (5), the process of the invention makes it possible to increase gradually the capacity of an existing plant, this being according to the needs and with an advantageous staging of the investment costs.

It is appropriate that what follows should be reported here. Documents U.S. Pat. No. 3,976,743, U.S. Pat. No. 4,107,265 and BE-A-724214 describe processes for the treatment of zinc ferrite which make use of reactions (I) and (II), but not of reaction (III). These known processes do not make it possible to increase the capacity of the existing zinc plants producing ferrite, because all these plants already utilize reactions (I) and (II) in one way or another.

Document WO-A-91/09146 describes a process for the treatment of zinc ferrite, comprising, successively, leaching of the ferrite with acid returning from electrolysis (reaction II), partial neutralization of the residual acid by addition of ZnS concentrate in the presence of oxygen (reactions I and III), reduction of the trivalent iron by addition of concentrate (reaction I), flotation of the pulp so as to separate from it elemental sulphur and unreacted concentrate, treatment of the flotation residue with $SO_2$ in order further to leach the iron, the zinc and the impurities, treatment of the pulp resulting therefrom with elemental sulphur to precipitate the copper, flotation of the pulp so as to separate from it a copper sulphide concentrate, filtration of the pulp and precipitation of the iron in the resultant solution. This known process differs from the process of the invention not only in its complexity but also in the fact that reaction (II) is used before reactions (I) and (III), which lengthens the leaching period, as the Applicant has ascertained.

Documents U.S. Pat. No. 4,510,028 and EP-A-0071684 describe a process for the treatment of zinc ferrite by acidic leaching in one or two stages, in the presence of concentrate and with oxygen under pressure at 135°–175° C. (reactions I, II and III). The ferrite:concentrate ratio must be such that the zinc contained in the ferrite amounts to 5–40% and preferably to 5–20% of all the zinc contained in the ferrite and the concentrate. In contrast to the process of the invention, this known process therefore requires autoclaves for leaching the ferrite and the concentrate. Moreover, since this known process gives the best results with a low ferrite-:concentrate ratio, its installation into an existing plant producing ferrite would at once enormously increase the capacity of this plant, which is not often opportune.

Document EP-A-0166710 describes a process as defined at the beginning of the present application, except that the concentrates:ferrite ratio employed in the operation (c) is not specified, that the operation (c) is performed partially under pressure and that the operation (d) is omitted. In this known process, a portion of the calcine produced in the operation (a) is leached in the operation (b) and all of the ferrite produced in the operation (b) is leached in the operation (c). The operation (c) is performed in three stages. In the first stage, the ferrite and a leaching residue which is relatively depleted in zinc, produced in the second stage, are treated with acid returning from electrolysis in the presence of oxygen and in atmospheric conditions so as to produce a primary leachate and a leaching residue which is depleted in zinc, which are separated. In the second stage, a leaching residue which is rich in zinc, produced in the first stage, and optionally concentrate, are treated with the said primary leachate in the presence of oxygen and at 120°–160° C., that is to say in an autoclave or equivalent apparatus, so as to produce a secondary leachate and the said residue which is relatively depleted in zinc, which are separated. In the third stage, concentrate is treated with the said secondary leachate in the presence of oxygen and in atmospheric conditions so as to produce a leachate which is rich in zinc and in iron and the said leaching residue which is rich in zinc, which are separated. The work is done so that the leachate which is rich in zinc and in iron has an acid content of approximately 4 to 8 g/l. This solution is subjected directly to the operation (e), which consists in precipitating the iron in the form of goethite, using as neutralizing agent the other portion of the calcine produced in (a). This known process differs from the process of the invention not only in the absence of the operation (d) and the complexity of the operation (c), the use of which additionally requires an autoclave or equivalent apparatus, but also in the fact that virtually all of the acid is exhausted in the operation (c) by the reactions (I) and (III). However, it has been found that the overall duration of the operation (c) is thus lengthened excessively. Moreover, as in this known process the other portion of the calcine produced in (a) is employed as neutralizing agent in (e), goethite containing a substantial quantity of zinc ferrite is necessarily produced, and this can be avoided in the process of the invention.

Document U.S. Pat. No. 4,004,991 describes a process for the extraction of zinc from sulphide concentrates, according to which the concentrates are leached in two stages countercurrentwise with acid returning from electrolysis in the presence of oxygen at 135°–175° C., that is to say in an autoclave. As this known process does not comprise the operations (a) and (b), the only point in common between this process and the process of the invention lies in the fact that a leaching is performed in two stages with acid returning from electrolysis.

When the operation (e) is excluded, the process of the invention provides for four different routes, which will be called "variants" below:

first variant:
    performing the operation (c) in a single stage with only a portion of the ferrite residue produced in the operations (b) and (d)
second variant:
    performing the operation (c) in a single stage with all of the ferrite residue produced in the operations (b) and (d)
third variant:
    performing the operation (c) in two stages with only a portion of the ferrite
fourth variant:
    performing the operation (c) in two stages with all of the ferrite.

When working in comparable conditions (the same concentrate and the same quantity of concentrate employed in (a), the same molar ratio of iron in the ferrite to the reactive sulphur in the concentrate employed in (c) and, when the first and the third variants are employed, the same fraction of ferrite used in (c)), the zinc output will be the lowest in the first variant and the highest in the fourth. In the first and third variants, the zinc output can be varied with the fraction of ferrite used in (c). In each of the four variants, the zinc output can also be varied by modifying the said molar ratio. As already mentioned above, the conventional process for the extraction of zinc, employed in the existing plants which make ferrite, already makes use of the reactions (I) and (II). The increase in output which is obtained by substituting the process of the invention for this conventional process in these plants will therefore be linked essentially with the quantity of zinc dissolved in (c) by the reactions (I) and (III). The first variant will therefore be employed when it is intended to produce a relatively small increase in capacity (for example from 5 to 10%) or when it is intended to produce a number of increases of small extent consecutively.

The second variant will be employed to increase the plant capacity substantially, and the fourth when it is intended to increase the capacity further. The third variant will normally be employed only when it is intended, for any reason whatever, to continue to treat a portion of the ferrite by the conventional route and at the same time to draw maximum profit from the fraction of ferrite used in (c).

The molar ratio of the iron contained in the zinc ferrite to the reactive sulphur contained in the concentrate is at least approximately 0.2 and preferably at least 0.3 in order that the rate of leaching in (c) should not become too low. It is obvious that this ratio must be lower than 2 in order that it may still be possible to resort to the reaction (III). In the fourth variant, this ratio will be advantageously equal to or lower than 0.6, preferably equal to or lower than 0.4, in order that the zinc output should be at a maximum. This ratio of $\leq 0.6$ is furthermore also suitable in the case of the other variants.

With regard to the conditions of the leaching in one stage (first and second variants):

- the $H_2SO_4$ content of the leachate which is rich in zinc and in iron is at least 45 g/l and preferably at least 55 g/l; otherwise, there is a risk of precipitating lead and silver jarosites which not only interfere with the leaching itself but can moreover subsequently be detrimental to the recovery of precious metals from the zinc residue; furthermore, an acid content which is too low also complicates the separation of the residue which is depleted in zinc from the leachate;
- the $H_2SO_4$ content of the leachate is not higher than 75 g/l and preferably not higher than 65 g/l; otherwise too much calcine must be employed in (d);
- the $Fe^{3+}$ content of the leachate is 1–10 g/l, preferably 2–5 g/l, because in these conditions the leaching rate and yield are optimal.

It is particularly useful to take care that the trivalent iron concentration does not drop below approximately 0.1 g/l, preferably not below 0.2 g/l, during the initial phase of the leaching. If there is a drop below approximately 0.1 g/l of $Fe^{3+}$, there is a risk not only of having corrosion problems, especially with the steels commonly employed for the construction of leaching equipment, but also of forming $H_2S$ and of seeing the copper disappear from the solution, copper which catalyses the reaction III. To avoid these problems, the potential of the pulp must be at least 530 mV (SHE) and preferably at least 560 mV. Furthermore, it is also advantageous to watch that the potential of the pulp does not rise above 640 mV in the said initial phase, because ferrite dissolves less quickly above 610 mV.

It is therefore important to check rigorously, especially using potential measurements, the trivalent iron concentration of the solution in the various phases of the leaching and to adjust this concentration as necessary by modifying the flow rate of oxygen and/or the temperature, a reduction in the temperature making the reactive sulphur less reducing and therefore less demanding for trivalent iron.

With regard to the conditions of leaching in two stages (third and fourth variants):

- the $H_2SO_4$ content of the leachate which is rich in zinc and in iron is at least 10 g/l; otherwise the leaching period is appreciably lengthened;
- the $H_2SO_4$ content of the said leachate is not higher than 35 g/l, preferably not higher than 25 g/l; otherwise too much calcine must be employed in (d);
- the $Fe^{3+}$ content of the said leachate is 0.1–2 g/l, preferably 0.5–1 g/l; if there is a drop below 0.1 g/l of $Fe^{3+}$, there is a risk of having the abovementioned problems; on the other hand, if there is a rise above 2 g/l of $Fe^{3+}$, there is a risk of forming lead and silver jarosites, and this makes the separation of the leaching residue which is rich in zinc from the leachate which is rich in zinc and in iron much more difficult.

It is advantageous to oxidize at least 30%, preferably at least 40%, of the reactive sulphur in the second stage of leaching. If less than 30% of this sulphur is oxidized in the second stage, there is a risk of consuming too much acid in the first leaching stage and thus forming lead and silver jarosites, which not only interfere with the leaching itself but which can furthermore subsequently be detrimental to the recovery of the valuable metals from the leaching residue which is depleted in zinc.

It is particularly useful to perform the first stage of leaching so that the trivalent iron concentration of the solution, which will necessarily be low during the initial phase of this stage, reaches a value of 2–10 g/l, preferably of 3–7 g/l, in the final phase of this stage. It is, in fact, in these conditions that the leaching rate and yield become optimal.

It is furthermore important to take care that the trivalent iron concentration does not drop below 0.1 g/l, preferably not below 0.2 g/l, during the said initial phase, because otherwise there is a risk of having the abovementioned problems: corrosion, formation of $H_2S$ and disappearance of the copper from the solution. It is therefore important to watch that the potential is at least 530 mV and preferably at least 560 mV in the said initial phase and it is also important to control rigorously, especially by potential measurements, the trivalent iron concentration of the solution in the other phases of the first stage of leaching and to adjust this concentration as required, as mentioned above.

As already stated above, it is not advisable to consume too much acid in the first stage of leaching. In fact, it is appropriate to end this stage at an acid concentration of 40–70 g/l, preferably of 55–65 g/l. It is therefore important to watch that the quantities of acid, of ferrite and of sulphur (in the form of leaching residue which is rich in zinc) which are introduced in the first stage of leaching are such that the primary leachate has a sulphuric acid content of 55–65 g/l. The second stage of leaching is advantageously performed so as to maintain the trivalent iron concentration of the solution constantly at the above level of 0.1–2 g/l, preferably of 0.5–1 g/l, this being in order to avoid the abovementioned problems.

Other details and special features of the invention will emerge from the description of two embodiments of the process of the invention, which is given by way of nonlimiting example and with reference to the drawings enclosed herewith.

BRIEF DESCRIPTION OF THE DRAWINGS

In these drawings

In these figures, the same reference numbers indicate identical components.

DESCRIPTION OF THE PREFERRED EMBODIMENTS

Figure 1:
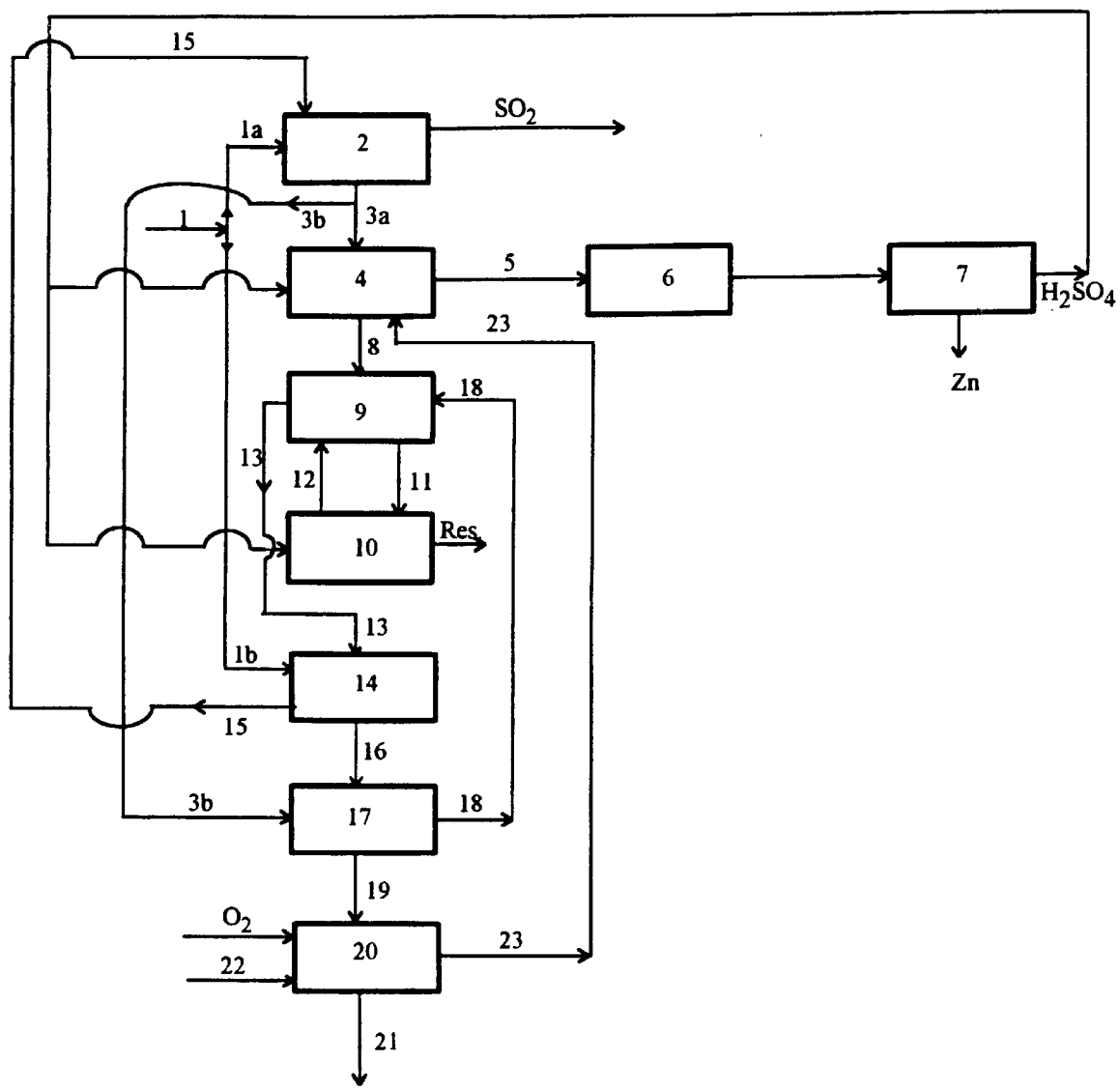
FIG. 1 shows a diagram of an existing zinc plant employing the conventional process for zinc extraction.

The plant shown in FIG. 1 receives a zinc sulphide concentrate 1 as feed. A portion 1a of this concentrate is roasted in 2 and a portion 3a of the calcine thus produced is subjected in 4 to a neutral leaching with sulphuric acid returning from electrolysis. The solution 5 leaving 4, which is rich in zinc and in iron-free substance, is purified in 6 and electrolysed in 7. The residue 8 from the neutral leaching, which is composed essentially of zinc ferrite and of gangue, is introduced into the first stage 9 of a hot acidic leaching in which stage the ferrite is leached with an acidic solution 12 produced in the second stage 10 of this hot acidic leaching. In the second stage 10, the residue 11 produced in 9 is leached in a very acidic medium with acid returning from electrolysis. The residue produced in 10 contains the gangue and insoluble compounds, especially lead sulphate. The solution 13 produced in 9 is a leachate which is rich in zinc and in iron: approximately 100 g/l Zn, 25–30 g/l $Fe^{3+}$ and 50–60 g/l $H_2SO_4$. This solution is treated in a reduction stage 14 with a second portion 1b of the concentrate to return its $Fe^{3+}$ content below 5 g/l. The residue 15 produced in 14 is recycled in 2 and the solution 16 of low $Fe^{3+}$ content, produced in 14, is treated in a neutralization stage 17 with a second portion 3b of the calcine produced in 2 to return its acid content below 10 g/l. The ferrite residue 18 produced in 17 is recycled at 9 and the conditioned solution 19 produced in 17 is treated in 20 in order to separate most of the iron from it, for example in the form of goethite 21. In this case, oxygen is injected in 20 into the solution while the latter is being neutralized, preferably with pure calcine 22 obtained by roasting pure ZnS concentrates, so as not to lose zinc in ferrite form. The solution 23 produced in 20, which is a solution rich in zinc and depleted in iron, is recycled at 4.

It has already been proposed in the literature to modify the conventional process described above in the sense that the reduction stage 14 is eliminated and that the second portion 2a of the concentrate is introduced into the first stage 9 of the hot acidic leaching, which then becomes a hot reducing acidic leaching.

Figure 2:
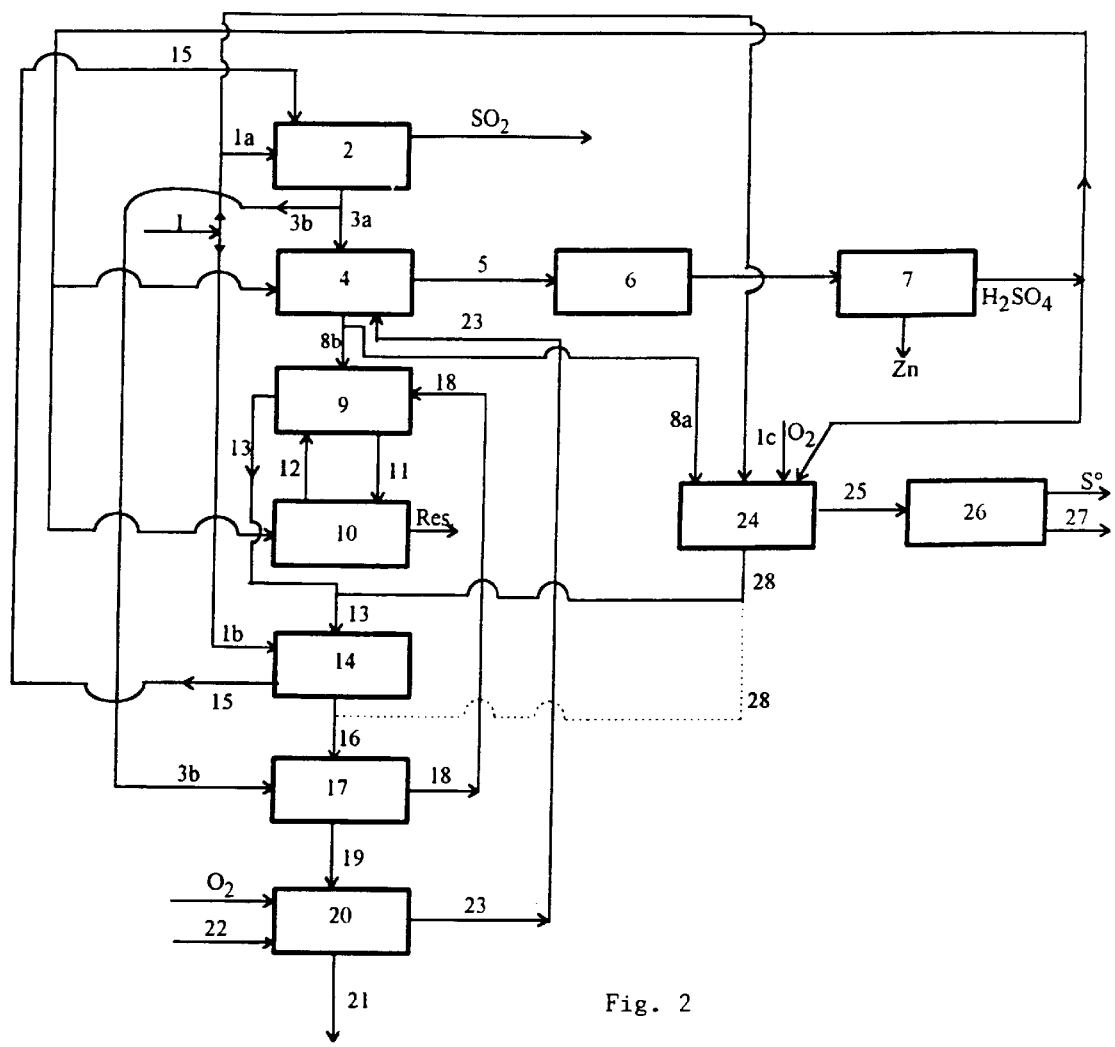
FIG. 2 shows a diagram of an existing zinc plant which has been adapted for using an embodiment of the first variant of the process of the invention.

FIG. 2 shows the plant of FIG. 1 after its adaptation for using the first variant of the process of the invention. An additional quantity 1c of the concentrate and a portion 8a of the ferrite are now leached in one stage with the acid returning from electrolysis in the presence of oxygen at 24 (operation (c)). The remainder 8b of the ferrite is treated in 9. The leaching residue which is depleted in zinc 25, produced in 24, is treated in 26 in order to extract from it the elemental sulphur S° and the valuable metals 27. When the solution which is rich in zinc and in iron 28, produced in 24, requires a reduction (solid line) it is added to the solution 13 (or to the hot reducing leaching, when the latter is present); otherwise it is added to the solution 16 (dotted line).

Figure 3:
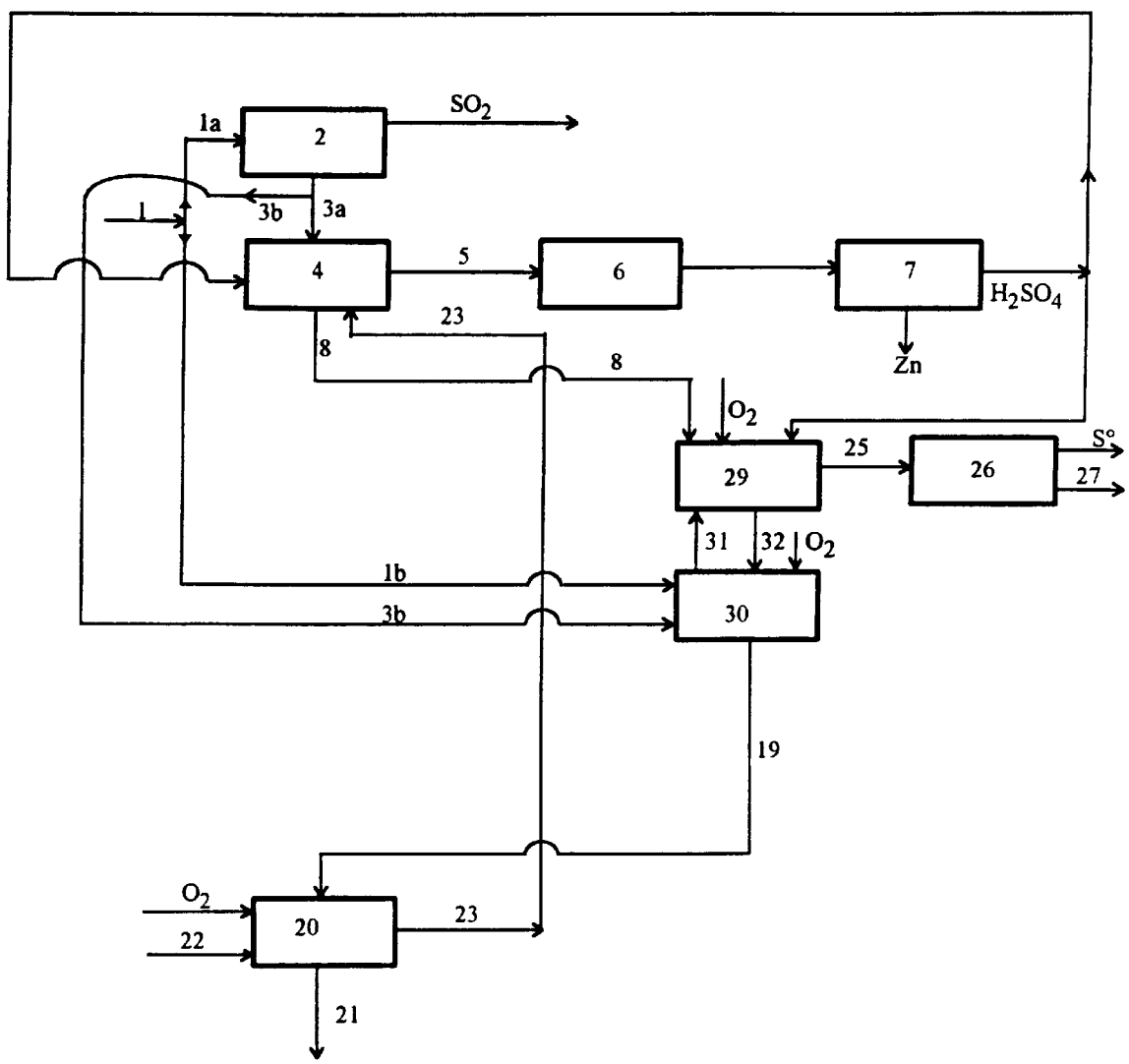
FIG. 3 shows a diagram of an existing zinc plant which has been adapted for using an embodiment of the fourth variant of the process of the invention.

FIG. 3 shows the plant of FIG. 1 after its adaptation for using the fourth variant of the process of the invention. Since all of the ferrite 8 is now treated in the operation (c) and since in the embodiment which is to be described the operation (d) is incorporated in the operation (c), stages 9, 10, 14 and 17 are eliminated. The operation (c) is performed in two stages 29 and 30. In the first stage 29, the ferrite 8 and the leaching residue which is rich in zinc 31, produced in the second stage 30, are leached with returning acid in the presence of oxygen. The leaching residue which is depleted in zinc 25, produced in 29, is treated, as in the plant of FIG. 2, in 26 in order to extract the elemental sulphur S° and the valuable metals. In the second stage 30, an additional (substantial) quantity 1b of concentrate is leached in the presence of oxygen with the solution 32 produced in 29. At the end of the leaching in 30, a portion 3b of the calcine is added to the pulp so as to bring the acid content of the solution to below 10 g/l, after which the residue 31 is sent to the first stage 29 and the solution 19, which is already conditioned, to stage 20.

It is obvious that the equipment which is released by eliminating stages 9, 10, 14 and 17 can, for the most part, be reemployed for making use of stages 29 and 30.

Figure 4:
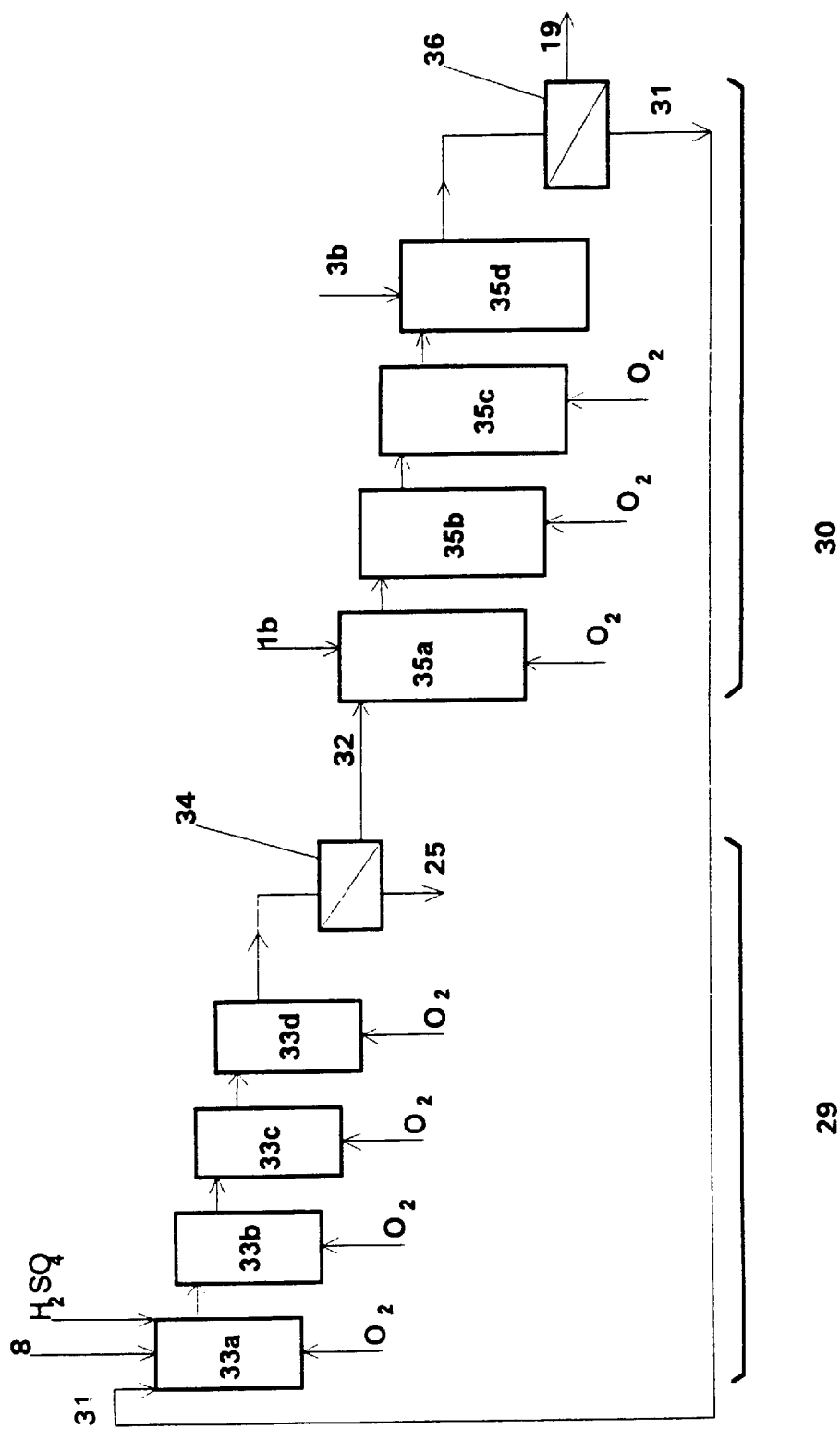
FIG. 4 shows diagrammatically the plant used for performing the operations (c) and (d) in the embodiment of FIG. 3.

The plant shown in FIG. 4 comprises a first series of four leaching tanks 33a, 33b, 33c and 33d which are placed in cascade and followed by a solid-liquid separator 34 and a second series of three leaching tanks 35a, 35b and 35c, also placed in cascade and followed by a neutralization tank 35d and a solidliquid separator 36. Each tank overflows into the following tank, except for the tanks 33d and 35d which overflow into the separators 34 and 36 respectively. The separator 34 comprises a thickener and a filtration apparatus, and the separator 36 a filtration apparatus.

Figure 5:
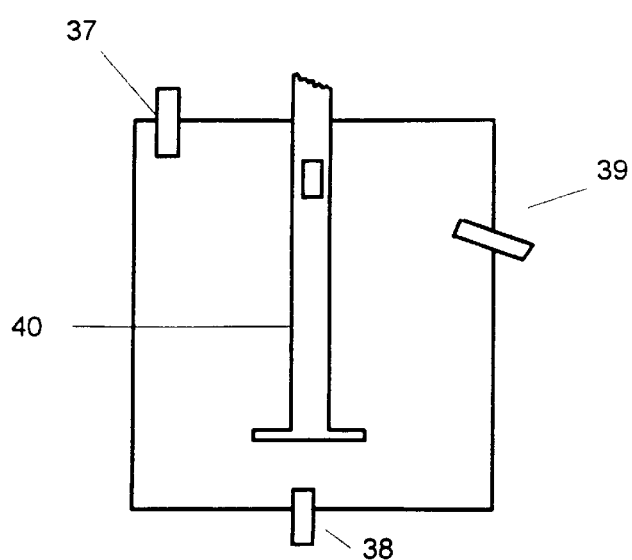
FIG. 5 shows, on larger scale and in more detail, a tank of the plant of FIG. 4.

The leaching tanks are closed and equipped, as shown in FIG. 5, with a feed inlet 37, an oxygen inlet 38, a spillway 39 and a self-sucking stirrer 40, for example a self-sucking stirrer with a hollow shaft or with a helical turbine with a suction sleeve. This stirrer has a threefold function: to keep the solids in suspension, to draw in and disperse the oxygen in the reaction mixture and to ensure, continuously, the recycling of the oxygen. The leaching tanks are also equipped with measuring and control devices which are not shown, for measuring the potential within and the pressure above the reaction mixture and for regulating the oxygen flow rate as a function of the pressure and the stirrer speed as a function of the potential, or vice versa. These tanks are furthermore provided with a device, not shown, for checking the temperature and with a safety valve.

Instead of being provided with a single multipurpose stirrer, the leaching tanks may be equipped with two stirrers: a constant-speed mixer-stirrer placed axially and used to keep the solids in suspension and to disperse the oxygen, and a variable-speed self-sucking stirrer placed eccentrically and used to recycle the unreacted oxygen. With this arrangement, it would be advisable to regulate the oxygen flow rate as a function of the potential and the speed of the self-sucking stirrer as a function of the pressure.

The neutralization tank 35d is provided with a feed inlet, a spillway, means for regulating the flow rate of calcine as a function of the acidity and a device for checking the temperature.

In the plant described above, the first stage of leaching 29 is performed in the first series of tanks and the second stage 30 in the second series of tanks.

The tank 33a is fed continuously with a stream of returning acid, with the bottom stream 8 of a thickener, not shown, which separates the products of the neutral leaching 4, and with the solid phase 31 leaving the filtration apparatus 36 which separates the products of the second stage of leaching 30; the stream 8 therefore contains zinc ferrite and the stream 32 the leaching residue which is rich in zinc, this residue also containing zinc ferrite, especially the ferrite originating from the calcine used in the neutralization tank 35d.

The products of the first stage of leaching, which leave the tank 33d, are separated in the separator 34 and the stream 32 of primary leachate which is thus obtained is introduced continuously together with the stream 1b of zinc sulphite concentrate into the tank 35a.

The flow rates of the returning acid stream and of the streams 1b, 3b and 8 are such that the molar ratio of the iron contained in the streams 8 and 32 to the reactive sulphur contained in the stream 1b is approximately 0.3 and that the sulphuric acid content of the stream leaving the tank 35c is approximately 20 g/l.

The pulp leaving the neutralization tank 35d has a sulphuric acid content of approximately 5 g/l.

The volumes of the tanks are such that the residence time of the reaction mixture is approximately 6 hours in the first series of tanks and approximately 5 hours in the second series of tanks.

In each leaching tank, the potential of the solution is maintained at an appropriate level, especially at 560–610 mV (SHE) in 33a, at 590–630 mV in 33b, at 610–650 mV in 33c, at 640–660 mV in 33d and at 560–620 mV in 35a, 35b and 35c. The checking of the potential and, hence, the trivalent iron content of the solution is performed by the abovementioned measuring and regulating devices.

The temperature in each leaching tank is kept at approximately 90° C. and the overpressure therein remains at a very low level, for example at 5–20 cm of water, or even less, by virtue of the action of the self-sucking stirrer.

The action of the abovementioned measuring and regulating devices will normally suffice to keep the potential at the intended level. However, if these devices were found for any reason whatsoever to be incapable by themselves of keeping the potential at the intended level, it would also be possible to intervene by varying the temperature.

When working as described above, approximately 45% of the reactive sulphur is oxidized in the second stage of leaching and a zinc leaching yield of approximately 98% is reached, this being therefore with a total leaching period of approximately 11 hours. The copper present in the concentrate 1b is found again almost entirely in the leachate 19, from which it will be subsequently separated, and the lead and the silver from the concentrate are found again in the leaching residue 25, from which they can be easily separated by flotation, because this residue is practically free from jarosites.

The streams 1a and 1b can obviously have the same composition or a different composition.

The number of tanks may vary. In fact, the leaching yield increases up to a certain point with the number of tanks, because with an increasing number of tanks it is possible to improve favourably the potential profile which it is desired to apply to the first stage of leaching and at the same time the probability that all the ore particles undergo leaching during the required period of time is increased. Needless to say, however, the cost of the plant also increases with the number of tanks. The choice of this number will therefore be determined by considerations of a technical and economic nature.

A major advantage of the process of the invention, namely the shortening of the duration of the operation (c), is illustrated by the examples given below.

EXAMPLE 1

This example describes a test of leaching in one stage (operation (c)) according to the process of the invention.

Starting materials employed
- (α) 2 kg of a blende which has the following composition, in % by weight: 53.9 Zn, 5.6 Fe, 2.32 Pb, 30.5 $S^{tot}$, 29.0 reactive $S^{2-}$ (=$S^{tot}$ less pyrite S) and 0.02 Cu; this blende has a particle size of 90% smaller than 44 mm;
- (β) 1215 g of a zinc ferrite which has the following composition, in % by weight: 20.9 Zn, 30.4 Fe and 5.78 Pb;
- (γ) 22.5 l of a cell returning acid containing 189 g/l of $H_2SO_4$.

The molar ratio of the iron contained in (β) and the reactive sulphur contained in (α) is 0.36.

Apparatus employed

A closed tank of 30-l capacity, equipped with a feed inlet, an oxygen inlet, a stirrer, a potentiometer probe and means for controlling the temperature.

Leaching (α) and (β) are added to (γ) over 60 minutes and at the same time the temperature is gradually increased from 75° to 90° C. At the end of this operation virtually all of the ferrite has dissolved. Oxygen injection is then commenced and leaching is continued. The reaction is stopped after 7.5 h.

Table 1 below gives the change in the main parameters during the leaching.

TABLE 1

| Time h | mV (SHE) | T °C. | $Fe^{2+}$ g/l | $Fe^{3+}$ g/l | $H_2SO_4$ g/l |
|---|---|---|---|---|---|
| 1 | 590 | 90 | 10.6 | 0.2 | 120 |
| 2 | 593 | 90 | 14.0 | 0.6 | 89 |
| 3 | 595 | 90 | 15.4 | 0.7 | 79 |
| 4 | 597 | 90 | 15.6 | 0.8 | 70 |
| 5 | 603 | 90 | 16.1 | 1.0 | 65 |
| 6 | 610 | 90 | 15.4 | 1.6 | 60 |
| 7 | 617 | 90 | 14.8 | 2.1 | 56 |
| 7.5 | 625 | 90 | 14.4 | 2.6 | 53 |

The pulp is filtered and 26.5 l of leachate which is rich in zinc and in iron and 1095 g of residue which is depleted in zinc are obtained.

The leachate which is rich in zinc and in iron contains, in g/l: 14.4 $Fe^{2+}$, 2.6 $Fe^{3+}$ and 53 $H_2SO_4$.

The residue which is depleted in zinc contains, in the dry state, in % by weight: 5.9 Zn, 1.3 Fe, 10.0 Pb, 57 $S^{tot}$, 52 S° and 0.04 Cu.

The leaching yield of zinc is 95.2%.

EXAMPLE 2

This example describes a test of leaching in two stages (operation (c)) according to the process of the invention.

Starting materials employed
- (α) as in Example 1;
- (β') 937 g of a zinc ferrite which has the same composition as that of Example 1;
- (γ') 14.8 l of a cell returning acid which has the same composition as that of Example 1;
- (δ) 1429 g of a leaching residue which is rich in zinc, which has the following composition, in % by weight: 42.4 Zn, 4.5 Fe, 3.18 Pb, 42.9 $S^{tot}$, 21.5 reactive $S^{2-}$, 18.8 S° and 0.05 Cu;

this residue was obtained during a previous operation which was substantially identical to the second stage of leaching which will be described below, which means that 47.0% of the reactive sulphur contained in (α) will be oxidized in this second stage of leaching.

The molar ratio of the iron contained in (β') to the reactive sulphur contained in (α) is therefore 0.28, whereas the molar ratio of the iron contained in (β') to the reactive sulphur contained in (δ) is 0.53.

Apparatus employed

As in Example 1, except that the closed tank has a capacity of 20 l.

First stage of leaching

First of all (δ) is added to (γ') over 30 minutes and then (β') over 60 minutes while the temperature is gradually raised from 75° to 90° C. during the first hour of this charging operation. Oxygen is injected during the charging only when the potential of the pulp falls below 560 mV. By first of all adding (δ') to (γ'), the potential of the solution is lowered to a level of 560–610 mV, at which—as the Applicant has ascertained—zinc ferrite dissolves most quickly. (The cell returning acid (γ') has a potential appreciably higher than 610 mV. In a batch leaching, it is therefore important to take measures in order that the potential of the acid should be rapidly returned to the level of 560–610 mV. Such measures are generally not required in a continuous leaching because the pulp to which the cell returning acid, the zinc ferrite and the leaching residue which is rich in zinc are added in this case will almost always have a potential lower then 610 mV.)

Once the charging is finished, the introduction of oxygen into the tank is commenced and the potential of the solution is gradually raised by increasing the flow rate of oxygen so as to obtain a value of 630–650 mv after 6 h of leaching.

Table 2 below gives the change in the main parameters during this first stage of leaching.

TABLE 2

| Time h | mV (SHE) | T °C. | $Fe^{2+}$ g/l | $Fe^{3+}$ g/l | $H_2SO_4$ g/l |
|---|---|---|---|---|---|
| 1 | 571 | 90 | 5 | 0.15 | 157 |
| 2 | 568 | 90 | 15.5 | 0.8 | 91 |
| 3 | 588 | 90 | | | |
| 4 | 601 | 90 | 16.8 | 2.3 | 68 |
| 5 | 621 | 90 | | | |
| 6 | 638 | 90 | 12.5 | 6.1 | 56 |

The pulp is filtered and a primary leachate and 974 g of residue depleted in zinc are obtained.

The primary leachate (ε) contains, in g/l: 12.5 $Fe^{2+}$, 6.1 $Fe^{3+}$ and 56 $H_2SO_4$.

The residue which is depleted in zinc contains, in the dry state, in % by weight: 3.2 Zn, 1.45 Fe, 9.2 Pb, 58 $S^{tot}$, 55 S° and 0.03 Cu.

Second stage of leaching

The blende (α) is added continuously to the primary leachate (ε) over a period of time of 60 minutes while the temperature is raised at the same time from 65° C. to 85° C. The oxygen flow rate is adjusted so as to keep the potential of the solution between 560 and 590 mV. The leaching is stopped after 5 h.

Table 3 below gives the change in the main parameters during this second stage of leaching:

TABLE 3

| Time h | mV (SHE) | T °C. | $Fe^{2+}$ g/l | $Fe^{3+}$ g/l | $H_2SO_4$ g/l |
|---|---|---|---|---|---|
| 0.5 | | 75 | | | |
| 1 | 561 | 85 | 16.5 | 0.6 | 52 |
| 2 | 570 | 85 | 16.8 | 1.1 | 40 |

TABLE 3-continued

| Time h | mV (SHE) | T °C. | $Fe^{2+}$ g/l | $Fe^{3+}$ g/l | $H_2SO_4$ g/l |
|---|---|---|---|---|---|
| 3 | 578 | 85 | 16.9 | 0.9 | 30 |
| 4 | 580 | 85 | 17.1 | 1.1 | 22 |
| 5 | 574 | 85 | 17.2 | 1.0 | 17 |

After filtration of the pulp, a leachate which is rich in zinc and the leaching residue which is rich in zinc (δ) are obtained.

The leachate which is rich in zinc contains, in g/l: 17.2 $Fe^{2+}$, 1.0 $Fe^{3+}$ and 17 $H_2SO_4$.

The leaching yield of zinc is 98%, this being therefore after a leaching period of 11 hours.

EXAMPLE 3

This comparative example describes a test of leaching in two stages (operation (c)) according to the process of the prior art discussed above (EP-A-0451456).

Starting materials employed (α) as in Example 1;

(β") 1215 g of a zinc ferrite which has the same composition as that of Example 1;

(γ") 16.6 l of a cell returning acid which has the same composition as that of Example 1;

(δ') 1008 g of a leaching residue which is rich in zinc, which has the following composition, in % by weight: 19.8 zn, 2.05 Fe, 4.5 Pb, 59 $S^{tot}$, 10.3 reactive $S^{2-}$, 48 S° and 0.15 Cu; this residue was obtained during a previous operation which was appreciably identical to the second stage of leaching which will be described below, which means that this time 82.1% of the reactive sulphur contained in (α) will be oxidized in the second stage of leaching.

The molar ratio of the iron contained in (β") to the reactive sulphur contained in (α) is here 0.36, that is to say a little higher and therefore more favourable than in Example 2, whereas the molar ratio of the iron contained in (β") to the reactive sulphur contained in (δ') is now 2.03.

Apparatus employed

As in Example 2.

First stage of leaching

The charging is performed as in Example 2, that is to say that first of all (δ') is added to (γ") over 30 minutes and then (β") over 60 minutes while the temperature is gradually raised from 75° to 90° C. during the first hour. Leaching is then continued and is stopped after 4 h.

Attempts to lower the potential of the reaction mixture to the level of 560–610 mV, which favours the dissolution of the ferrite, were unsuccessful, probably because of the low content of reactive sulphur in (δ').

Table 4 below gives the change in the main parameters during this first stage of leaching.

TABLE 4

| Time h | mV (SHE) | T °C. | $Fe^{2+}$ g/l | $Fe^{3+}$ g/l | $H_2SO_4$ g/l |
|---|---|---|---|---|---|
| 1 | 640 | 90 | 4.2 | 0.5 | 166 |
| 2 | 679 | 90 | 10.8 | 4.2 | 105 |
| 3 | 665 | 90 | 14.3 | 3.5 | 97 |
| 4 | 655 | 90 | 15.8 | 3.4 | 94 |

The pulp is filtered and a primary leachate and 1079 g of residue which is depleted in zinc are obtained.

The primary leachate (ε') contains, in g/l: 15.8 $Fe^{2+}$, 3.4 $Fe^{3+}$ and 94 $H_2SO_4$.

The residue which is depleted in zinc contains, in the dry state, in % by weight: 3 Zn, 1.7 Fe, 10.3 Pb, 56 $S^{tot}$, 53 S° and 0.17 Cu.

Second stage of leaching

The blende (α) is added continuously to the primary leachate (ε') over a period of time of 60 minutes while at the same time the temperature is raised from 65° C. to 85° C. The oxygen flow rate is adjusted so as to keep the potential of the solution between 560 and 590 mV, as in Example 2. However, after approximately nine hours' leaching, it is no longer possible to keep the potential below 590 mV, which apparently means that the reactivity of the blende has become very low. Nevertheless, oxygen continues to be injected in order to make the blende react further, and the leaching is stopped after 16 h.

Table 5 below gives the change in the main parameters during this second stage of leaching.

TABLE 5

| Time h | mV (SHE) | T °C. | $Fe^{2+}$ g/l | $Fe^{3+}$ g/l | $H_2SO_4$ g/l |
|---|---|---|---|---|---|
| 1 | 567 | 85 | 19.70 | 0.1 | 101.5 |
| 2 | 579 | 85 | 20.30 | 0.35 | 92.5 |
| 4 | 589 | 85 | 21.20 | 0.60 | 75.5 |
| 5 | 589 | 85 | 22.20 | 0.90 | 57.0 |
| 10 | 598 | 85 | 22.95 | 0.90 | 52.2 |
| 12 | 611 | 85 | 22.40 | 1.90 | 41.5 |
| 14 | 613 | 85 | 22.35 | 2.45 | 32.5 |
| 16 | 619 | 85 | 21.85 | 3.25 | 22.0 |

After filtration of the pulp, a leachate which is rich in zinc and the leaching residue which is rich in zinc (δ") are obtained.

The leachate which is rich in zinc contains, in g/l: 20.2 $Fe^{2+}$, 2.8 $Fe^{3+}$ and 22 $H_2SO_4$.

The leaching yield of zinc is 98%, this being therefore after a total leaching period of 20 hours.

When these examples are compared, it is seen that the time required to carry out the operation (c) in the process of the prior art exceeds by 114% that required to carry out this operation with practically the same yield in the first and second variants of the process of the invention, and by 82% that required to carry out this operation with the same yield in the third and fourth variants of the process of the invention. This is equivalent to saying that, with the process of the invention, as much is done in 0.47 reactor volume (1st and 2nd variants) or in 0.55 reactor volume (3rd and 4th variants) as with the process of the prior art in 1 reactor volume.

The industrial exploitation of the process of the invention will therefore entail investment costs which will be far lower than those of the process of the prior art.

It is obvious that some special features of the operation (c) which have just been described in connection with the process of the invention can be very useful in a context other than that of the process of the invention described above.

This is why the Applicant also requests protection for a process for leaching zinc ferrite together with a sulphide material containing zinc sulphide, according to which the leaching is performed with a solution of sulphuric acid at 60°–95° C. in atmospheric conditions so as to produce a leachate which is laden with zinc and with iron and a leaching residue which is depleted in zinc and in iron, this process being characterized in that (1) the work is done with a sulphide material:ferrite ratio such that the quantity of reactive sulphur present in the sulphide material is appreciably higher than that which can be oxidized by the iron present in the ferrite, the reactive sulphur being the sulphur which is present in the form of sulphide and which can be converted into elemental sulphur by the ferric sulphate, (2) a stream of sulphide material, a stream of ferrite and a stream of acid are introduced continuously into the first tank of a series of tanks, the pulp thus formed is passed successively through the other tanks of the series, a stream of oxygen is introduced into these other tanks and in each tank of the series conditions are maintained such that the pulp leaving the last tank consists of leachate laden with zinc and with iron and of leaching residue which is depleted in zinc and in iron, and (3) care is taken that the potential of the pulp should not fall below 530 mV (SHE) and preferably not below 560 mV in the first tank.

The sulphide material may be a zinc sulphide concentrate or a partially leached zinc sulphide concentrate.

It is possible to refrain from introducing oxygen into the first tank and to keep the potential therein at at least 530 mv by working therein with a sulphide material:ferrite ratio which is sufficiently low and/or at a temperature which is sufficiently low.

It is also possible to keep the potential in the first tank at at least 530 mv by introducing an appropriate stream of oxygen into it.

We claim:

1. A process for leaching zinc ferrite together with a sulphide material containing zinc sulphide, comprising the steps of leaching the zinc ferrite and the sulfide material with a solution of sulphuric acid at 60°–95° C. at a pressure equal to or differing by less than 20 kPa from atmospheric pressure to produce a leachate which is laden with zinc and with iron and a leaching residue which is depleted in zinc and in iron, quantities of the sulphide material and of zinc ferrite providing a molar ratio between iron contained in the zinc ferrite and reactive sulphur contained in the sulphide material to be at least approximately 0.2, the reactive sulphur being the sulphur which is present in the form of sulphide and which can be converted into elemental sulphur by oxidation with ferric sulphate, wherein, (1) the leaching is done with the sulphide material-ferrite ratio being such that the quantity of reactive sulphur present in the sulphide material is higher than that which can be oxidized by the iron present in the zinc ferrite, (2) a stream of the sulphide material, a stream of the zinc ferrite and a stream of the sulfuric acid are introduced continuously into a first tank of a series of tanks forming a pulp in the first tank which is passed successively through the other tanks of the series, a stream of oxygen is introduced into these other tanks and conditions are maintained in each tank of the series such that pulp leaving the last tank consists of leachate laden with zinc and with iron, containing 45–70 g/l of sulphuric acid and 2–10 g/l of $Fe^{3+}$, and of leaching residue which is depleted in zinc and in iron, and (3) a potential of the pulp in the first tank is at least 530 mV (SHE).

2. Process according to claim 1, wherein the potential in the first tank is kept at at least 530 mV by controlling one of the sulphide material to ferrite ratio and a tank temperature.

3. Process according to claim 1, wherein the potential in the first tank is kept at at least 530 mV by introducing a stream of oxygen into it.

4. The process of claim 2 wherein the potential is at least 560 mV in the first tank.

5. In a process for extracting zinc from zinc sulphide concentrates comprising the steps of
   a) providing zinc sulphide concentrates;
   b) roasting a first portion of the concentrates to produce a calcine;
   c) neutral leaching a first portion of the calcine to form a zinc rich and substantially iron-free leachate and a separate zinc ferrite residue;
   d) acid leaching the separate zinc ferrite rich residue to form a zinc and iron rich solution;
   e) subjecting the zinc and iron rich solution to one of (1) a reducing step to return a $Fe^{+3}$ content of the zinc and iron rich solution to below 5 g/l by adding a second portion of the concentrates to the zinc and iron rich solution and a subsequent neutralizing step wherein a remainder of the calcine is added to the zinc and iron rich solution to form a ferrite residue to be recycled to the acid leaching step (d) and a solution containing iron and zinc with a free $H_2SO_4$ content below 10 g/l and (2) a neutralizing step wherein a remainder of the calcine is added to the zinc and iron rich solution to form a ferrite residue to be recycled to the acid leaching step (d) and a solution containing iron and zinc with a free $H_2SO_4$ content below 10 g/l;
   f) precipitating iron from the solution containing iron and zinc leaving a zinc rich solution and recycling the zinc rich solution to the neutral leach of step (c), the improvement comprising performing an additional leaching step comprising one of:
      (i) leaching at least a portion of the step (c) separate zinc ferrite residue with a third portion of the concentrates, a return spent electrolyte at 60°–95° C. at a pressure equal to or differing by less than 20 kPa from atmospheric pressure and finely dispersed oxygen to produce a zinc and iron rich leachate and a separate zinc-depleted leaching residue, the quantities of the third portion of the concentrates and the at least a portion of the step (c) separate zinc ferrite residue being such that a molar ratio between iron in the portion of the step (c) zinc ferrite residue and a reactive sulfur contained in the third portion of the concentrates is at least approximately 0.2, the reactive sulfur being sulfur which is present in the form of sulfide and which can be converted to elemental sulfur by oxidation with ferric sulphate; wherein leaching step (i) is performed in a single stage so that the zinc and iron rich leachate has a sulfuric acid content of 45–75 g/l and an $Fe^{+3}$ content of 1–10 g/l and the zinc and iron rich leachate is merged with one of the zinc and iron rich solution from the acid leaching step (d) and the zinc and iron rich solution of the reducing step (e)(1); and
      (ii) leaching at least a portion of the step (c) separate zinc ferrite residue with a third portion of the concentrates, a return spent electrolyte at 60°–95° C. at a pressure equal to or differing by less than 20 kPa from atmospheric pressure and finely dispersed oxygen to produce a zinc and iron rich leachate and a separate zinc-depleted leaching residue, the quantities of the third portion of the concentrates and the at least a portion of the step (c) separate zinc ferrite residue being such that a molar ratio between iron in the portion of the step (c) zinc ferrite residue and a reactive sulfur contained in the third portion of the concentrates is at least approximately 0.2, the reactive sulfur being sulfur which is present in the form of a sulfide and which can be converted to elemental sulfur by oxidation with ferric sulphate; wherein the leaching step (ii) is performed in two stages;
         1) a first stage comprising leaching at least a portion of the zinc ferrite residue and a recycled zinc rich leaching residue with return spent electrolyte and finely dispersed oxygen to produce a primary leachate and a zinc depleted residue; and
         2) a second stage wherein the third portion of the concentrates is leached with the primary leachate and finely dispersed oxygen to produce a leachate rich in zinc and iron and a separate zinc leaching residue, the zinc rich residue being recycled to the first stage, the second stage being performed in conditions such that less than 60% of the reactive sulphur is oxidized therein and that the zinc rich leaching residue produced therein has a reactive sulphur content which is higher than that which can be oxidized in the first stage by the iron present in the zinc ferrite residue, the leachate rich in zinc and iron having a sulfuric acid content of 10–35 g/l and a $Fe^{+3}$ content of 0.1–2 g/l, the leachate rich in zinc and iron being merged with one of the zinc and iron rich solution from the acid leaching step (d) and the zinc and iron rich solution of the reducing step (e)(1).

6. The process of claim 5 wherein the additional leaching step comprises step (i).

7. The process of claim 6 wherein all of the step (c) separate zinc ferrite residue is leached in step (i) so that said acid leaching step (d) is bypassed.

8. The process of claim 6 wherein the sulphuric acid content is between 55 and 65 g/l and the $Fe^{+3}$ content is between 2 and 5 g/l for step (f)(i).

9. Process according to claim 6, wherein the zinc ferrite residue, the third portion of the concentrate and the return spent electrolyte are introduced continuously into a first tank of a series of tanks with overflow which are placed in cascade, in each of these tanks conditions are maintained such that pulp overflowing from the last tank consists of the zinc and iron rich leachate and of the zinc-depleted leaching residue and the last tank overflows into a solid-liquid separator which separates the zinc-depleted leaching residue from the zinc and iron rich leachate.

10. The process of claim 5 wherein the additional leaching step comprises step (ii).

11. The process of claim 10 wherein all of the step (c) separate zinc ferrite residue is leached in step (ii) so that said acid leaching (d) is bypassed.

12. The process of claim 10 wherein the sulfuric acid content is between 10 and 25 g/l and the $Fe^{+3}$ content is between 0.5 and 1 g/l for step (f)(ii).

13. Process according to claim 10, wherein at least 30% of the reactive sulphur is oxidized in the second stage of leaching.

14. Process according to claim 13, wherein the first stage of leaching is performed so that the $Fe^{3+}$ concentration of the solution reaches a value of 2–10 g/l in a final phase of the first stage.

15. Process according to claim 14, wherein the $Fe^{+3}$ concentration is at least 0.1 g/l in an initial phase of the said first stage.

16. Process according to claim 13, wherein the quantities of the return spent electrolyte, of the zinc ferrite residue and of reactive sulphur which are introduced into the first stage of leaching are such that the primary leachate has a sulphuric acid content of 40–70 g/l.

17. Process according to claim 13, characterized in that the $Fe^{3+}$ concentration of the solution in the second stage of leaching is maintained constantly at a level of 0.1–2 g/l.

18. Process according to claim 10, wherein prior to separating the leachate which is rich in zinc and in iron from the leaching residue which is rich in zinc, the remainder of the calcine is added during a final chase of the leaching step for adjustment of the free $H_2SO_4$ content so that step (e) is by passed.

19. Process according to claim 18, wherein, during the first stage leaching, the zinc ferrite residue, the leaching residue which is rich in zinc and the return spent electrolyte are introduced continuously into a first tank of a first series of tanks with overflow which are placed in cascade, in each of these tanks conditions are maintained such that pulp overflowing from the last tank comprises the primary leachate and the zinc-depleted residue, the last tank overflowing into a solid-liquid separator which separates the zinc-depleted residue from the primary leachate, this primary leachate together with the third portion of the concentrates are introduced continuously into a first tank of a second series of tanks with overflow which are placed in cascade, in each tank of this second series conditions are maintained such that pulp overflowing from the last tank consists of the leachate rich in zinc and in iron and leaching residue rich in zinc, the last tank of this series overflowing into a neutralization tank in which the remainder of the calcine is added to the pulp, the neutralization tank overflowing into a solid-liquid separator which separates the leachate which is rich in zinc and iron from the leaching residue rich in zinc, the leaching residue then being recycled towards the first tank of the first series.

20. Process according to claim 9, wherein the tanks are equipped with a self-sucking stirrer, are connected to a source of oxygen, and a stirrer speed and oxygen delivery are regulated so as to keep a potential in each tank at a set level.

21. The process of claim 5 wherein the $Fe^{+3}$ content is between 1 and 3 g/l for said reducing step and the free $H_2SO_4$ content is between 3 and 5 g/l for said neutralizing step.

22. The process of claim 13 wherein at least 40% of the reactive sulfur is oxidized in the second stage of leaching.

23. The process of claim 14 wherein the $Fe^{+3}$ concentration is between 3 and 7 g/l in the final phase.

24. The process of claim 15 wherein the $Fe^{+3}$ concentration is at least 0.2 g/l in the initial phase.

25. The process of claim 17 wherein the $Fe^{+3}$ concentration in the second stage is at a level between 0.5 and 1 g/l.

26. The process according to claim 19, wherein the tanks of the first and second series are equipped with a self-sucking stirrer, are connected to a source of oxygen, and a stirrer speed and oxygen delivery are regulated so as to keep a potential in each tank at a set level.

* * * * *